(12) United States Patent
Harrison et al.

(10) Patent No.: US 7,759,443 B2
(45) Date of Patent: Jul. 20, 2010

(54) POLYMERISATION OF ETHYLENICALLY UNSATURATED MONOMERS

(75) Inventors: Richard J Harrison, Godmanchester (GB); Bruce C Gilbert, Helsington (GB); Andrew F Parsons, Helsington (GB); Derek J Irvine, Yarm (GB)

(73) Assignee: Croda International, Inc., Goole, East Yorkshire (GB)

( * ) Notice: Subject to any disclaimer, the term of this patent is extended or adjusted under 35 U.S.C. 154(b) by 998 days.

(21) Appl. No.: 10/549,856

(22) PCT Filed: Mar. 24, 2004

(86) PCT No.: PCT/GB2004/001260

§ 371 (c)(1),
(2), (4) Date: Jun. 26, 2006

(87) PCT Pub. No.: WO2004/085494

PCT Pub. Date: Oct. 7, 2004

(65) Prior Publication Data

US 2007/0037938 A1   Feb. 15, 2007

(30) Foreign Application Priority Data

Mar. 25, 2003   (GB)   ................. 0306820.2

(51) Int. Cl.
*C08F 20/06* (2006.01)
*B01J 31/20* (2006.01)
(52) U.S. Cl. .................. 526/317.1; 526/89; 526/90; 502/117; 502/118; 502/128
(58) Field of Classification Search ............ 526/89, 526/90, 317.1; 502/117, 118, 128
See application file for complete search history.

(56) References Cited

U.S. PATENT DOCUMENTS 4,053,316 A * 10/1977 Lu ............................... 522/24

FOREIGN PATENT DOCUMENTS

GB   1149961   4/1969

OTHER PUBLICATIONS

Gilbert et al. "Polymerization of methyl Methacrylate using Dimanganese Decacarbonyl in the presence of Organohalides" *Macromolecules*, 36, 9020-9023(2003).*
V. O. Kudyshkin et al., "Control of the Molecular Weight of Polyvinylcaprolactam," *Russian Journal of Applied Chemistry*, 1999, p. 1846 (Abstract).
B.C. Gilbert et al., "Polymerization of Methyl Methacrylate Using Dimanganese Decarbonyl in the Presence of Organohalides," *Macromolecules*, 2003, vol. 36, pp. 9020-9023.
International Search Report dated Jun. 18, 2004 for PCT/GB2004/001260.

* cited by examiner

*Primary Examiner*—Ling-Siu Choi
(74) *Attorney, Agent, or Firm*—Jones Day

(57) ABSTRACT

Ethylenically unsaturated, particularly acrylic, monomers are polymerized using a catalyst system including a manganese carbonyl initiator, an organic halogen reactive substrate and an allylic halide chain termination agent. Desirably the manganese carbonyl initiator is a dimanganese compound, particularly dimanganese decacarbonyl ($Mn_2(CO)_{10}$). The catalysis mechanism appears to involve initiator homolysis, abstraction of halogen from the reactive substrate forming an organic free radical which acts as a chain initiator for polymerization and eventual reaction of the propagating chain radical with the chain terminating agent. The speed or extent of reaction may be modified by the inclusion of Lewis acids in the reaction mixture. The resulting polymers are telechelic and may have different end groups. The polymers can be reacted further to functionalize them and/or to form block copolymers.

38 Claims, No Drawings

POLYMERISATION OF ETHYLENICALLY UNSATURATED MONOMERS

CROSS REFERENCE TO RELATED APPLICATION

This application is the National Phase application of International Application No. PCT/GB2004/001260, filed Mar. 24, 2004, which designates the United States and was published in English. This application, in its entirety, is incorporated herein by reference.

This invention relates to a method of polymerising ethylenically unsaturated monomers, which method can produce telechelic polymers, in particular such a method using a catalyst system including manganese compound(s), to the catalyst system, novel (co)polymers made by the method and copolymers made by further reaction based on the polymers.

Polymerising ethylenically unsaturated monomers by atom transfer radical polymerisation (ATRP), e.g. using chelated copper catalysts, can yield, particularly acrylic, polymers having well controlled molecular weights with a narrow spread of molecular weights. The ATRP reaction sequence is thought to involve abstraction by the copper catalyst of a halogen atom from a substrate molecule to give a radical which initiates polymerisation, continuing until the chain radical end abstracts a halogen atom from the halogen-copper catalyst species, regenerating the catalyst which can react to start further polymer chains. The polymer can react with further catalyst to recommence polymerisation.

The use of manganese carbonyls, specifically dimanganese decacarbonyl, as free radical polymerisation initiators has been reported by Bamford, Chapter 3 of Reactivity, Mechanism and Structure in Polymer Chemistry, Ed Jenkins and Ledwith (Wiley 1974), who described photolysis of manganese decacarbonyl in the presence of carbon tetrachloride leading to the polymerisation of methyl methacrylate to high conversion, and by Yagci and Hepuzer, Macromolecules 1999, 32, 6367, who described the photolysis of dimanganese decacarbonyl leading to a manganese pentacarbonyl radical which abstracted a halogen atom from a halogenated solvent to generate a carbon based free radical which was oxidised by an onium salt to give a cationic initiator for polymerising epoxides and vinyl ethers. Neither of these reports offers any suggestion that polymer molecular weight can be controlled and repeating the reaction described by Bamford leads to high molecular weight materials.

The present invention is based on our discovery that using manganese carbonyl free radical initiators in combination with a halogen containing reactive substrate and an allylic halide chain termination agent, enables a polymerisation reaction that can produce polymers having controlled molecular weights and a relatively narrow molecular weight distribution. Further, it is possible to make polymers with functional residues at the chain ends which differ from the bulk of the polymer chain (telechelic polymers) and such telechelic polymers having different terminal groups at opposite ends of the polymer chain. These telechelic copolymers can be further reacted with monomer(s) by chain extension polymerisation(s) or by reaction with pre-formed polymeric blocks to produce block copolymers.

The present invention accordingly provides a method of polymerising ethylenically unsaturated monomers in which at least one ethylenically unsaturated monomer is polymerised using a catalyst system having a manganese carbonyl radical initiator, a halogen containing reactive substrate and an allylic halogen substituted chain termination agent.

The invention further includes a method of free radical polymerisation of ethylenically unsaturated monomers comprising:
1 forming a free radical by homolysis of a Mn—Mn or C—Mn bond in a manganese carbonyl radical initiator;
2 reacting this free radical by abstracting a halogen atom from a halogen containing reactive substrate to form a reactive substrate free radical;
3 reacting monomer with the reactive substrate free radical in a free radical chain extension reaction;
4 carrying out further free radical chain extension reactions with monomer to form a polymer or copolymer chain, particularly one having a desired statistical number of monomer units; and
5 reacting the polymer or copolymer chain with an allylic halogen substituted chain termination agent to terminate polymerisation.

The invention includes a catalyst system for polymerising ethylenically unsaturated monomers which is a combination of a manganese carbonyl radical initiator, a halogen containing reactive substrate and an allylic halogen substituted chain termination agent.

The terms "catalyst system", "catalyst" and "catalytic" are used to refer to the combination of the manganese carbonyl radical initiator, the reactive substrate and the chain termination agent and possibly also the individual components of this combination as the combination has a major influence on the polymerisation reaction even though the combination is not strictly a catalyst as the manganese component is not regenerated during the reaction and the reactive substrate and the chain termination agent are incorporated into the polymer.

The polymers and/or copolymers produced directly by the polymerisation reaction of the invention have a residue of a reactive substrate at one end of the chain and a residue of a chain terminating agent at the other. The invention accordingly includes a polymer or copolymer of one or more ethylenically unsaturated monomers having at one end of the (co) polymeric chain a residue of a reactive substrate and a residue of a chain terminating agent at the other. In addition to their properties as (co-)polymers, such (co-)polymers can have valuable reactivity towards other compounds to permit further modification by reaction with the end groups, including by reacting with pre-formed other (co-)polymeric materials or by carrying out further polymerisation steps using one or both end groups as starting points for further polymerisation.

The manganese carbonyl radical initiator is desirably either a dimanganese carbonyl compound or an organo-, particularly alkyl, manganese carbonyl compound. Such compounds include those of the formula (I):

where
$R^1$ is $C_1$ to $C_{30}$ hydrocarbyl, particularly alkyl, e.g. $C_1$ to $C_{20}$ alkyl, especially $C_1$ to $C_6$ alkyl e.g. methyl; aryl e.g. phenyl; aralkyl, particularly $C_7$ to $C_{20}$ aralkyl, e.g. benzyl, or such groups substituted with halogen atoms, particularly Cl or F, alkyl groups, particularly $C_1$ to $C_6$ alkyl e.g. methyl, ethyl and t-butyl, groups, alkoxy particularly $C_1$ to $C_6$ alkoxy e.g. methoxy groups, or an acyl group particularly of the formula —C(O)$R^2$ where $R^2$ is alkyl, particularly $C_1$ to $C_6$ alkyl or aryl, particularly phenyl, which may be substituted with halogen atoms, particularly Cl or F, alkyl groups, particularly $C_1$ to $C_6$ alkyl e.g. methyl, ethyl and t-butyl, groups alkoxy particularly $C_1$ to $C_6$ alkoxy e.g. methoxy groups; or a group of the formula: —Mn(CO)$_n$ (Lig)$_p$ where Lig, n and p are as defined below;

each Lig is a ligand species particularly a phosphine or amine ligand, such as a tertiary phosphine ligand, particularly a tri-hydrocarbyl phosphine e.g. trialkyl, particularly $C_1$ to $C_6$ alkyl e.g. tri-isopropyl or tri-n-butyl, or triphenyl phosphine or substituted variants of such ligands; or an amine ligand which may be primary, secondary or tertiary amine ligand e.g. alkyl, dialkyl or trialkyl amines particularly $C_1$ to $C_6$ alkyl e.g. methyl, ethyl or butyl amines, or substituted variants such as corresponding hydroxyalkyl e.g. 2-hydroxyethyl, amines.

n is from 1 to 5; and p is from 0 to 4;

such that n+p=5.

Within formula (I) dimanganese carbonyl compounds can be particularly suitable initiators, e.g. compounds of the formula (Ia):

$$(Lig)_p(CO)_nMn—Mn(CO)_n(Lig)_p \quad (Ia)$$

where Lig, p and n are as defined for formula (I), such that p+n=5

An especially useful dimanganese carbonyl initiator is dimanganese decacarbonyl $\{Mn_2(CO)_{10}=(CO)_5Mn—Mn(CO)_5=[Mn(CO)_5]_2\}$ and in a specific aspect, the invention includes a method and a catalyst of the invention where the initiator is or includes manganese decacarbonyl.

Within the ranges set out above, the values of n and p may vary, but usually p will be 0 or 1, with n correspondingly being 5 or 4, as values of p greater than 1 are unlikely to give any particular advantage over initiators where p is 1 and the presence of multiple relatively bulky ligand groups will tend to make the Mn—Mn or Mn—C bond weaker, possibly to the point where the compound spontaneously and reversibly dissociates even under ambient storage conditions. The presence of a ligand, "Lig", in the initiator may provide benefit in terms of solubility or compatibility with other components in the polymerisation system. The use of liganded manganese species may further simplify recovery of catalyst residues at the end of the polymerisation.

We believe that the mechanism of catalysis involves homolysis, particularly thermolysis or photolysis, of the Mn—Mn bond in dimanganese carbonyl initiators or the C—Mn bond in alkyl manganese carbonyl initiators to yield a manganese carbonyl radical generically $.Mn(CO)_n(Lig)_p$ (where n, p and Lig are as defined above) and which where p=0 is $.Mn(CO)_5$ e.g. where the initiator is dimanganese decacarbonyl or an alkyl manganese pentacarbonyl, which then abstracts a halogen atom from the reactive substrate to generate a reactive substrate radical, which acts as the starting point for the chain reaction leading to polymerisation, and produces a manganese carbonyl halide. Where an alkyl manganese carbonyl compound is used as an initiator there will also be an alkyl radical which may also give rise to a free radical polymerisation sequence.

The overall initial reaction sequence appears to be along the lines (for simplicity of illustration with manganese decacarbonyl as the initiator):

$$Mn_2(CO)_{10} \rightarrow 2.Mn(CO)_5$$

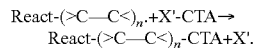

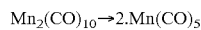

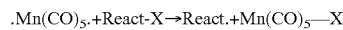

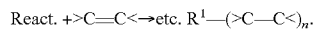

where X is a halogen atom, particularly chlorine or bromine; React. is the radical derived from the reactive substrate molecule after halogen abstraction; >C=C< represents an ethylenically unsaturated monomer; and >C—C< a monomer residue in the polymer chain -(>C—C<)$_n$- having "n" repeat units.

Chain termination may occur by reaction of the chain with a molecule of a chain termination agent:

$$React-(>C—C<)_n.+X'-CTA \rightarrow$$
$$React-(>C—C<)_n-CTA+X'.$$

where each $R^1$ is independently as defined above, and CTA is the residue of a chain termination agent after removal of a halogen atom, X'. Where the chain termination agent residue (CTA) is used as the reactive substrate the resulting telechelic polymer is terminated symmetrically. However the reactive substrate and the chain termination agent can be and desirably are different and in this case the resulting polymer will have different groups at the chain ends. In either case the chain is terminated by a moiety which is not derived from units of the main repeat monomer(s) producing a telechelic polymer.

This sequence does not necessarily end the reaction as the halogen atom radical may react to forms radicals e.g. by reacting with reactive substrate:

$$X.+React-X \rightarrow React.+X_2$$

or by reacting with the alkene:

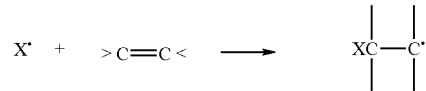

or by reacting with a manganese carbonyl initiator:

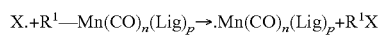

The resulting radicals may act to start further polymer chains. Other chain continuing reactions are also possible.

By choice of appropriate relative proportions of the monomer, manganese carbonyl initiator, reactive substrate and chain terminating agent, it is possible to make polymeric materials having chain lengths typically of from 5 to 500, more usually 10 to 300 and particularly from 20 to 200, repeat units. These correspond to approximate molecular weights for poly(methyl methacrylate) of from 500 to 50000, more usually 1000 to 30000 and particularly from 2000 to 20000 (and correspondingly for other monomers or mixtures of monomers). Such molecular weights are of interest to make polymers that can have interesting surface and interfacial effects and to make block units that can be reacted on with further monomers or pre-formed oligomeric or polymeric blocks to form block co-polymers.

We have found that the method of the invention can give polymers with relatively narrow molecular weight distributions e.g. as measured instrumentally as polydispersity (PDI). Especially where molecular weight control is good, PDI values of from 1.1 to 1.7, particularly from 1.2 to 1.6 have been obtained.

The chain terminating agent(s) act to terminate polymerisation of a chain, enabling statistical control of the molecular weight of the polymer product, and is a compound including a halogen substituted allyl group i.e. >C=C—C-Hal; where Hal is halogen, particularly chlorine or bromine. The allylic halogen substituted chain termination agent can be considered as a sub-set of the group of reactive substrates. Thus, chain termination agents can act as reactive substrates, but other reactive substrates do not generally act as chain termination agents. When the chain termination agent and the reactive substrate are present as different chemical compounds, we believe that the ease with which the relevant carbon halogen bond dissociates will (statistically) determine which residue is the starting point for polymerisation (see further below).

The chain terminating agent can be a simple allyl halide such as allyl chloride or, and particularly, allyl bromide. However, it is desirable that the molecule includes other groups(s) which activate the carbon halogen allylic bond which can thus act more efficiently as chain terminating agents, or provide functionality that is desired at an end of the resultant polymeric product chain. Accordingly, desirable chain terminating agent include compounds of the formula (II):

where
Hal is a halogen atom, particularly chlorine or bromine; and
$R^3$, and $R^4$ are each independently hydrogen, or a group:

where:
n is 0 or 1,
Link is a linking group, particularly an alkylene group e.g. a $C_1$ to $C_{12}$ alkylene group; or a polymeric residue derived from a polyester, a polyurethane, a polyalkoxylate, an acrylate polymer or copolymer, or a polysaccharide; and
$R^5$ is a halogen atom particularly a chlorine or bromine atom, or glycidyl; an ethylenic double bond; carbonyl; carboxyl; cyano; hydroxyl; amino or quaternary amino or ammonium; a phosphorus containing species; a sulphur containing species; a hydrogen bond donor or acceptor, an aromatic ring; a heterocyclic ring; or a saccharide residue.

Desirably at least one of $R^3$ and $R^4$ is other than hydrogen.

Allyl halides activated towards reactivity as chain terminating agents in the polymerisation system can include at least one further halogen atom e.g. as in dihalopropenes such as 2,3-dibromo- and 2,3-dichloro-propene, or a carboxylic group as in acids or esters such as 2-bromomethyl-prop-2-enoic acid and its alkyl esters, particularly $C_1$ to $C_6$ alkyl esters for example methyl, ethyl and butyl e.g. t-butyl esters. Such compounds appear to afford good control of molecular weight in experimental polymer synthesis, with the molecular weight of the polymer produced decreasing with increasing amounts of the chain terminating agent present.

The use of chain terminating agents including an allyl halide group leads to polymers having a terminating group including a double bond, and the presence of double bonds has been confirmed in experimental polymers using NMR ($^1$H and $^{13}$C) and mass spectrometry. Although this may provide useful functionality for further chemical modification of the polymer, it will often be desirable to incorporate other groups in the chain terminating residues such as are described above in connection with formula (II). Such other groups may include reactive groups such as:
  at least one further halogen atom;
  a glycidyl group;
  at least one further ethylenic double bond;
  a carbonyl group as in ketone or aldehyde functionality e.g. as in the residue —$CH_2.C(O)$-(hydrogen or alkyl);
  carboxyl as in a carboxylic acid, anhydride, ester or carbonate group;
  cyano;
  hydroxyl;
  primary, secondary or tertiary amino or quaternary amino or ammonium;

phosphorus containing species such as phosphates, phosphonates, phosphites, phosphine oxides, thiophosphates and thiophosphites;
sulphur containing species such as SR, where R is alkyl, sulphates, sulphonates, sulphonyl groups, sulphites and thioesters; hydrogen bond donors and acceptors, particularly based on coupled donor acceptor pairings, especially between C=O . . . H—N, C=O . . . H—O, O—H . . . N< or N—H . . . N< (in which the N may be in a ring which may be aromatic), which may be considered as synthetic mimics of the hydrogen bond donors and acceptors in nucleic acids such as DNA and RNA;
aromatic rings such as phenyl or substituted phenyl, particularly halogen e.g. fluorine, or vinyl substituted phenyl;
heterocyclic rings such as pyrrolidone or pyrazoline rings; or
a saccharide, particularly a sugar, residue such as a glucosyl, sorbityl or mannosyl group.

The main reason for including such reactive atoms or groups in the chain terminating agent is to enable such groups to be used, after polymerisation according to the invention, in coupling reactions with other groups, so as to enable the formation of block copolymers. The block copolymers can be formed directly by reactions with materials containing polymeric groups, or indirectly by reaction with a group which includes a centre that can then be the basis for further polymerisation.

Another approach to this is to link a preformed polymeric fragment to the chain terminating agent so as to form a copolymer during the polymerisation reaction of the invention. Examples of polymeric residues that can be used in this way include residues of:
polyesters such as polyterephthalates, particularly polyethylene terephthalate, polyhydroxyacids, such as polyhydroxystearic acid or polylactic acid, and polylactones such as polycaprolactone;
polyalkoxylates such as polyethylene glycol (PEG) or polypropylene glycol (PPG); polyurethanes such as those based on the reactions between toluene di-isocyanate or methylene diphenyldiisocyanate and polyols such as polyalkylene polyols e.g. PEG or PPG; vinylic polymers such as acrylate polymers such as polymethyl methacrylate (PMMA) and copolymers, particularly including residues of other (meth)acrylate esters or polystyrene; or polysaccharides, such as dextrins and starches.

It is further possible to provide such polymeric residues which include reactive groups such as those described above, so as to enable further reaction with polymeric species or as a growth point for further polymerisation. Such groups are referred as reactable macromers.

It is not clear precisely why the chain termination agents act to control molecular weight, but is seems likely that the allylic grouping, particularly if activated by another electron withdrawing substituent acts to make the molecule preferentially reactive towards the radicals at the end of the growing polymer chains. This effect appears to be more significant in chain termination as compared with the higher radical reactivity of (other) reactive substrates arising from a lower carbon-halogen bond dissociation energy (see further below). Generally, it is desirable that the reactive substrate and the chain termination agent are different compounds and accordingly, the invention specifically includes a method of polymerisation of ethylenically unsaturated monomers and a catalyst system for polymerising ethylenically unsaturated monomers of the invention, in which the halogen containing reactive substrate is not an allylic halogen substituted chain termination agent.

The halogen containing reactive substrate is the starting point for the polymerisation chain reaction so the residue of the reactive substrate provides one terminating group in the product polymer. The reactive substrates are compounds with activated carbon-halogen bonds and this includes the compounds described above as chain terminating agents as well as other halogen containing compounds. Particularly where it is desired to make a telechelic polymer having differing end groups, it is desirable to choose as the reactive substrate one which is significantly more active towards radical formation with the Mn species than chain terminating agents generally are. In this case, it is desirable to use a reactive substrate which has a carbon-halogen bond having a relatively low dissociation energy. Such reactive substrates can be termed "activated reactive substrates" to distinguish them from reactive substrates that can also act as chain terminating agents. Generally, activated reactive substrates are compounds having at least one carbon halogen bond with a dissociation energy of less than 400, more usually less than 350, and desirably less than 300, kJ.mol$^{-1}$. A range of activated reactive substrates and the approximate respective bond dissociation energies are set out in the following table:

| Compound | Bond | Dissociation Energy (kJ · mol$^{-1}$) |
| --- | --- | --- |
| bromotrichloromethane | Br—CCl$_3$ | 234 |
| carbon tetrabromide | Br—CBr$_3$ | 235 |
| benzyl bromide | Br—CH$_2$Phenyl | 241 |
| carbon tetrachloride | Cl—CCl$_3$ | 295 |
| benzyl chloride | Cl—CH$_2$Phenyl | 302 |

Examples of activated reactive substrates include:

halogen substituted alkanes, particularly with multiple halogen substitution e.g. carbon tetrachloride, carbon tetrabromide, chlorotribromomethane, trichloro- and tribromo-methanes and dichloro- and dibromo-methanes, corresponding longer chain haloalkanes such as C$_2$ to C$_6$ 1,1-dichloro- and dibromo-alkanes and 1,1,1-trichloro- and tribromo-alkanes e.g. dichloro-, dibromo-, trichloro- and tribromo-ethanes;

halogen substituted alcohols, acids and esters such as 2,2-dichloro-, 2,2-dibromo, 2,2,2-trichloro- and 2,2,2-tribro-moethanol, trichloroacetic acid and its alkyl, particularly C$_1$ to C$_6$ alkyl esters for example methyl, ethyl and butyl esters;

halogen substituted carboxylic acid esters such as alkyl, e.g. C$_2$ to C$_6$ alkyl, particularly ethyl, 2-bromo-2-methyl propionates;

aromatic substituted alkyl (aralkyl) halides such as benzyl halides e.g. benzyl chloride, bromide or iodide and, 2-halo-2-phenylethanes such as 2-bromo-2-phenylethane;

ring substituted benzyl halides such as alkyl substituted benzyl halides, particularly 4-alkyl benzyl halides, in particular where the alkyl group is a C$_1$ to C$_6$ alkyl, particularly methyl, ethyl and butyl e.g. t-butyl alkyl group, or halogen substituted, particularly 4-substituted benzyl halides such as 4-fluoro (or chloro) benzyl bromide (or chloride), or bis-haloalkyl substituted benzenes such as 1,2-di(bromomethyl)benzene;

sulphonyl chlorides such as benzene and toluene sulphonyl chlorides.

Although, reactive substrates can act efficiently to initiate polymerisation, activated reactive substrates do not appear to be effective in chain termination. Thus using such halides e.g. carbon tetrachloride, without a chain termination agent gives efficient but uncontrolled polymerisation, typically yielding polymer having a molecular weight greater than 70000.

Where an organic halide reactive substrate is used in combination with a chemically different chain terminating agent the resulting polymer will be telechelic with differing end groups.

The ethylenically unsaturated monomer can, in principle, be any ethylenically unsaturated monomer. However, the invention is particularly applicable to making polymers from acrylic monomers or mixtures including a substantial proportion of acrylic monomers for example at least 25 mole %, more usually at least 40 mole %, commonly at least 50 mole % and potentially at least 75 mole % e.g. up to 100 mole % of acrylic monomers. Suitable acrylic monomers include those of the formula (IV):

$$R^{10}-CR^{11}=CR^{12}-COR^{13} \qquad (IV)$$

where
R$^{10}$ is methyl or, and desirably, hydrogen;
R$^{11}$ is methyl or, and desirably, hydrogen;
R$^{12}$ is methyl or hydrogen;
provided that at least one of R$^{11}$ and R$^{12}$ is hydrogen, and R$^{13}$ is —OR$^{14}$, or —NR$^{15}$R$^{16}$ where R$^{14}$, R$^{15}$ and R$^{16}$ are each hydrogen, hydrocarbyl, particularly C$_1$ to C$_{20}$, more usually a C$_1$ to C$_8$, alkyl, C$_2$ to C$_8$ hydroxyalkyl, or a polyalkyleneoxy, particularly a polyethyleneoxy or polypropyleneoxy or a (random or block) co-poly(ethyleneoxy)(propyleneoxy) chain, desirably containing from 2 to 50 alkyleneoxy residues, and which may be H or alkyl, usually C$_1$ to C$_4$ alkyl terminated.

When the R$^{14}$ is hydrogen, the carboxyl group in a product polymer may be neutralised with cation, usually an alkali metal or ammonium or amine, including quaternary amine. Examples of such acrylic monomers include acrylate and methacrylate esters, particularly alkyl, desirably C$_1$ to C$_{10}$ alkyl, esters, especially methyl methacrylate, or polyalkyleneoxy e.g. alkyl, particularly C$_1$ to C$_4$ alkyl, especially methyl capped polyethyleneoxy, esters; acrylic and methacrylic acids, which can be in the form of salts, especially when neutralised after polymerisation; acrylic and methacrylic amides; and sulphonated acrylic monomers, particularly acrylamido methyl propyl sulphonate (AMPS) and acrylic or methacrylic acid isethionate.

Other ethylenically unsaturated monomers include vinyl monomers such vinyl halides especially vinyl chloride, vinyl aromatic monomers such as styrene, α-methyl styrene or vinyl toluene, vinyl caprolactone, vinyl caprolactam and N-vinyl pyrrolidone. The monomers can be polymerised to form telechelic homopolymeric or copolymeric materials.

The amount of initiator used will depend on the reactivity of the monomer(s) being polymerised and on the desired molecular weight. Typically the molar ratio of initiator to ethylenically unsaturated monomer will be from 1:500 to 1:10, more usually from 1:100 to 1:20, and commonly about 1:50. The relative molar proportion of reactive substrate to initiator will usually be from 0.5:1 to 10:1, more usually from 0.7:1 to 1:7 and commonly from 1:1 to 5:1. The molar ratio of chain terminating agent to reactive substrate, particularly an activated reactive substrate, will usually be from 5:1 to 1:2, more usually from 3:1 to 1:1.5 and commonly from 2:1 to 1:1.

The mechanism of the polymerisation reaction is believed, as explained above, to involve the free radicals from homolysis of the manganese carbonyl initiator which then react with the reactive substrate to form radicals which react with monomer to make polymer until polymerisation is terminated by reaction with a chain terminating agent. Generally it is usual to have all the catalyst components, manganese carbonyl initiator, reactive substrate and chain terminating agent present simultaneously with the monomer at the start of reaction. However, the free radicals are believed to have a long enough life to permit running the polymerisation in sequence e.g. by making the manganese carbonyl radical(s) and possibly also the radicals derived from the reactive substrate separately from the polymerisation reaction. Thus the manganese carbonyl initiator and reactive substrate can be mixed, homolysis of the manganese carbonyl initiator started and monomer added somewhat later, though not usually after the monomer is included in the reaction mixture. Conveniently this could be arranged as a continuous reaction e.g. by feeding monomer into a stream containing manganese carbonyl initiator and reactive substrate downstream of where homolysis of the manganese carbonyl initiator is started for example by having a heated zone or by exposure to suitably energetic radiation, most usually UV or visible light. The chain terminating agent could be included from the start or probably more conveniently fed in with the monomer.

We have found that the rate of reaction, particularly where the monomers are acrylic monomers, can be adjusted by including a Lewis acid, particularly a metal containing Lewis acid, in the reaction medium. The reason for the effect of Lewis acids is not clear but we believe that, for metal containing Lewis acids, the metal atoms in the Lewis acids can coordinate with the carbonyl groups on acrylic monomers and activate them towards polymerisation, leading to faster reaction and/or higher conversion. Lewis acids having small electronegative ligands such as halide e.g. chlorine or bromine, and/or including metals with occupied higher, particularly d or f, orbitals, more particularly transition metals having an atomic number of at least 30 (zinc), appear to be more effective in accelerating the reaction. Examples of useful Lewis acids include those based on magnesium e.g. magnesium halides such as magnesium bromide or magnesium chloride, zinc e.g. zinc halides, such as zinc bromide or zinc chloride, and salts such as zinc trifluoromethane-sulfonate (usually shortened to "triflate"—commonly abbreviated "Tf"), lanthanum salts such as lanthanum acetate, particularly as the heptahydrate, ytterbium salts such as the halides, particularly ytterbium chloride e.g. as the trihydrate, or triflate. Among these zinc chloride seem to be particularly effective. The beneficial effects on the speed of reaction or higher conversion may be linked with a slight broadening of the molecular weight distribution, but without detrimental effect on the control of molecular weight.

The temperature of reaction may depend on how homolysis of the manganese carbonyl radical initiator is carried out. Where radical formation is prompted by thermolysis, the polymerisation reaction will generally be carried out at a temperature sufficiently high that thermolysis of the relevant Mn—Mn or Mn—C bond readily takes place, typically at least 50° C. and up to 150° C., e.g. up to 120° C. particularly up to 100° C., and usually from 50 to 70° C. Within these temperature ranges we have found that the rate of reaction increases with temperature. Thus, we have found, experimentally, that increasing the temperature from 70° C. to 100° C. gave an increase in the relative rate of polymerisation of about 2.5 (2.7 check). Where radical formation is prompted by photolysis, the polymerisation reaction can be carried out at ambient, sub- or super-ambient temperatures, usually in the range 50 to 100° C. more usually −10 to 70° C. e.g. 50 to 70° C. or −10 to 10° C. The use of lower temperatures may aid control of the polymerisation e.g. by suppressing side reactions especially where the reactive substrate and/or chain terminating agent include reactive substituents.

The manganese carbonyl radical initiator compounds (and manganese halide catalyst residues) are sensitive to oxidation e.g. by atmospheric oxygen, so the reaction will typically be carried out in a suitably inert atmosphere for example (oxygen free) nitrogen, argon or carbon dioxide. Further, reagents and solvents will also be used in forms that do not add reactive oxygen to the reaction system, for example by ensuring that solvents are degassed/deoxygenated before use. Suitable solvents and diluents for the free radical polymerisation reaction include aromatic solvents such as toluene or xylene; halogenated solvents such as dichloromethane; alcohols such as iso-propanol; glycols such as monoethylene glycol and monopropylene glycol; ethers such as tetrahydrofuran; dialkyl ketones such as methyl ethyl ketone; lactones such as butyrolactone; dipolar aprotic solvents such as dimethyl formamide and dimethyl sulphoxide.

The concentrations of the reaction components can be those convenient according to the solubility of the components, particularly the monomer in the reaction medium or any solvent or diluent used. When aromatic solvents, such as toluene, are used for polymerising acrylic or largely acrylic monomers, the concentration of monomer can be from 5 to 80%, usually 10 to 70, more usually 20 to 40%, and typically about 25%, w/w of the monomer solvent mix.

Such concentrations generally correspond to a monomer molarity (based on the molecular weight of methyl methacrylate) of from 0.5 to 7, more usually 2 to 4 and typically about 2.5, molar. Corresponding amounts of the catalyst components will be used e.g. within the respective ratios and ranges given above. Thus, in a reaction where all the catalyst components are present with the monomer, for a 2.5 molar solution of methyl methacrylate, the concentration of the catalyst components will typically be, for the manganese carbonyl initiator e.g. dimanganese decacarbonyl, from 0.005 to 0.3, more usually from 0.01 to 0.1, e.g. about 0.044, molar, reactive substrate from 0.002 to 0.25, more usually from 0.05 to 0.2, and particularly from 0.04 to 0.15 molar, and chain terminating agent from 0.002 to 0.25, more usually from 0.05 to 0.2, and particularly from 0.04 to 0.15 molar.

Generally the polymerisation reaction will be carried out at ambient pressure. However, particularly if volatile or gaseous monomers are used, the pressure may be superambient e.g. up to 100 Bar (10 MPa).

It is likely that the presence of manganese carbonyl initiator catalyst residues, particularly as active catalyst, in the product polymer will be undesirable. Thus, the manganese carbonyl initiator in the reaction mix will usually be deactivated and desirably manganese residues removed from the reaction mix, at the end of the polymerisation reaction. The manganese carbonyl initiator can be inactivated by oxidation, for example by exposure to air, and the manganese oxide(s) resulting can be removed e.g. by filtration.

Polymer product can be separated from the reaction mixture e.g. by evaporation of volatiles or by precipitating the polymer by adding a polymer non-solvent e.g. for acrylic polymers such as poly(methyl methacrylate) a liquid alkane such as hexane, to the reaction mixture.

The catalytic reaction of the invention can produce end functionalised polymeric molecules. Such functionalised polymers can themselves be used as building blocks to produce more complex polymers for example ABA and ABC block copolymers, star copolymers (dendrimers).

Block co-polymers can be made from polymers of and made by the method of this invention by:

1 carrying out further polymerisation using the polymer as a substrate at one or both chain ends; or 2 by reacting the polymer with pre-formed polymeric blocks.

Each of these methods can produce AB, ABA or ABC block copolymers.

The invention accordingly includes a block copolymer having a first polymer block which is the residue of a polymer of or made by the present invention, and at least one second polymer block covalently bound to one or both ends of the first polymer block.

These product polymers can find applications as surfactants particularly dispersants, antifog additives, antistatic additives, emulsifiers or demulsifiers and personal care products foamers or defoamers; barrier polymers; compatibilisers; blowing agents; rheology modifiers; or gas hydrate inhibitors.

The following Examples illustrate the invention. All parts and percentages are by weight unless otherwise stated.

Test Methods

Polymer molecular weight—the polymer number average molecular weight was determined by gel permeation chromatography (gpc) on a system equipped with a guard column and two Shodex columns (KF-802.5 and KF-803) with a Waters 2410 differential refractive index detector using THF at 1 ml.min$^{-1}$ as eluent and standardised against narrow molecular weight distribution poly(methyl methacrylate) (PMMA) standards.

Polymer molecular weight dispersion (PDI)—was calculated from the gpc data.

Note: This gpc method has a limit of about 25000 for accurate molecular weight determination as at higher molecular weights the total exclusion limit of the gpc column is exceeded. Thus, molecular weights greater than 25000 are approximate and it is not possible to obtain accurate values of PDI (though approximate values could be obtained in some cases).

Polymer conversions were measured gravimetrically.

Polymer products were analysed using $^1$H and/or $^{13}$C NMR and fast atom bombardment (FAB) mass spectrometry, particularly for low molecular weight polymers, in particular to confirm the presence of double bonds at one or both ends of the polymer.

Synthesis Examples SE1 to SE12 illustrate the synthesis of the compounds of the formula (I).

SYNTHESIS EXAMPLE SE1

Methyl methacrylate was polymerised using dimanganese decacarbonyl as the polymerisation initiator and 2,3-dibromoprop-1-ene as reactive substrate and chain terminating agent. Methyl methacrylate (3.75 g; 4 ml; 37.5 mmol, as a 25% w/w solution in dry degassed toluene) was added to dimanganese decacarbonyl (0.29 g; 0.75 mmol) dissolved in dry degassed toluene (13 ml; 11.25 g) under a nitrogen atmosphere in a Schlenk tube (molar ratio of monomer to initiator 50:1). The tube was placed in a thermostatted oil bath at 60° C. for 1 hour and then 2,3-dibromoprop-1-ene (0.15 g; 0.75 mmol) was added using a degassed syringe. Samples (1-2 ml) were removed at intervals for analysis to check progress of the reaction. Conversion of the monomer reached 32.3% after 5 hours reaction time. At the end of the reaction time, the manganese carbonyl catalyst initiator residues were deactivated by oxidation by exposing the reaction mixture to air and the manganese was separated from the reaction mixture by filtration. The polymer product was recovered by precipitation from the reaction mixture using hexane.

SYNTHESIS EXAMPLE SE2

Example SE1 was repeated except that 2,3-dibromoprop-1-ene was used as the reactive substrate and chain terminating agent at a mole ratio of reactive substrate to dimanganese decacarbonyl of 2:1.

SYNTHESIS EXAMPLE SE3

Example SE1 was repeated except that the mole ratio of 2,3-dibromoprop-1-ene to dimanganese decacarbonyl was 3:1.

SYNTHESIS EXAMPLE SE4

Example SE1 was repeated except that the mole ratio of 2,3-dibromoprop-1-ene to dimanganese decacarbonyl was 4:1.

SYNTHESIS EXAMPLE SE5

Example SE1 was repeated except that 2,3-dichloroprop-1-ene was used as the reactive substrate and chain terminating agent and the molar amount of dimanganese decacarbonyl and 2,3-dichloroprop-1-ene used was double that used in SE1 (molar ratio 2:2).

SYNTHESIS EXAMPLE SE6

Methyl methacrylate (37.5 mmol) was polymerised by the method described in Example SE1 but using di[manganese tetracarbonyl triphenylphosphine] (0.75 mmol) as the polymerisation initiator and 2-(bromomethyl)acrylic acid (1.05 mmol) as the reactive substrate and chain terminating agent. Conversion of the monomer reached 80% after 70.5 hours reaction time. The di[manganese tetracarbonyl triphenylphosphine] used as the initiator included residual manganese decacarbonyl (from catalyst synthesis) so molecular weight measurements (by gpc) showed a bimodal distribution attributed to polymerisations initiated by the two initiators.

COMPARATIVE SYNTHESIS EXAMPLE CSE1

Example SE1 was repeated except that benzyl bromide was used instead of 2,3-dibromoprop-1-ene at a molar ratio of benzyl bromide to dimanganese decacarbonyl of 1:1.

COMPARATIVE SYNTHESIS EXAMPLE CSE2

Example CSE2 was repeated except that the molar ratio of benzyl bromide to dimanganese decacarbonyl was 2:1.

COMPARATIVE SYNTHESIS EXAMPLE CSE3

Example CSE2 was repeated except that carbon tetrachloride was used instead of benzyl bromide at a molar ratio of carbon tetrachloride to dimanganese decacarbonyl of 2:1.

COMPARATIVE SYNTHESIS EXAMPLE CSE4

Example SE1 was repeated except that ethyl 2-bromo-2-methylpropionate was used instead of 2,3-dibromoprop-1-ene at a mole ratio of ethyl 2-bromo-2-methylpropionate to dimanganese decacarbonyl of 2:1.

Reaction information and some properties of the polymers made in Synthesis Examples SE1 to SE8 and CSE1 to CSE4 are set out in Table 1 below.

TABLE 1

| Ex No | Reactive Substrate/ Chain Termination Agent | Ratio* | Conv (%) | Mn | PDI |
|---|---|---|---|---|---|
| SE1 | 2,3-dibromoprop-1-ene | 1:1 | 40.0 | ca 28000 | ca 1.50 |
| SE2 | 2,3-dibromoprop-1-ene | 2:1 | 32.3 | 17600 | 1.41 |
| SE3 | 2,3-dibromoprop-1-ene | 3:1 | 26.2 | 12900 | 1.26 |
| SE4 | 2,3-dibromoprop-1-ene | 4:1 | 22.5 | 8900 | 1.23 |
| SE5 | 2,3-dichloroprop-1-ene | 2:2 | 8.5 | 22550 | 1.52 |
| SE6 | 2-(bromomethyl)acrylic acid | 1.1 | 58 | 27300 | 1.54 |
| CSE1 | benzyl bromide | 1:1 | 83.5 | >70000 | — |
| CSE2 | benzyl bromide | 2:1 | 54.5 | >70000 | — |
| CSE3 | carbon tetrachloride | 2:1 | 48.2 | >70000 | — |
| CSE4 | ethyl 2-bromo-2-methylpropionate | 2:1 | 52.2 | >70000 | — |

*molar ratio of reactive substrate/chain terminating agent to dimanganese decacarbonyl In Synthesis Examples SE7 to SE10, the catalyst/initiator system includes reactive substrates and chain terminating agents which are different compounds.

SYNTHESIS EXAMPLE SE7

Example SE2 was repeated except that carbon tetrachloride was used as the reactive substrate and 2,3-dibromoprop-1-ene as the chain terminating agent at a mole ratio of reactive substrate to chain terminating agent to dimanganese decacarbonyl of 2:2:1.

SYNTHESIS EXAMPLE SE8

Example SE9 was repeated except that the mole ratio of reactive substrate to chain terminating agent to dimanganese decacarbonyl was 2:3:1.

SYNTHESIS EXAMPLE SE9

Example SE9 was repeated except that 2,3-dichloroprop-1-ene was used as the chain terminating agent.

SYNTHESIS EXAMPLE SE10

Example SE11 was repeated except that the mole ratio of reactive substrate to chain terminating agent to dimanganese decacarbonyl was 2:3:1.

COMPARATIVE SYNTHESIS EXAMPLE CSE5

Example SE2 was repeated except that a combination of carbon tetrachloride and benzyl bromide was used as the reactive substrate at a mole ratio of carbon tetrachloride to benzyl bromide to dimanganese decacarbonyl of 2:2:1.

COMPARATIVE SYNTHESIS EXAMPLE CSE6

Example CSE5 was repeated except that the mole ratio of carbon tetrachloride to benzyl bromide to dimanganese decacarbonyl was 2:3:1.

Reaction information and some properties of the polymers made in Synthesis Examples SE7 to SE10 and CSE5 and CSE6 are set out in Table 2 below.

TABLE 2

| Ex No | Chain terminating agent | Ratio* | Conv (%) | Mn | PDI |
|---|---|---|---|---|---|
| SE7 | 2,3-dibromoprop-1-ene | 2:2:1 | 29.0 | 7100 | 1.5 |
| SE8 | 2,3-dibromoprop-1-ene | 3:2:1 | 31.5 | 6600 | 1.45 |
| SE9 | 2,3-dichloroprop-1-ene | 2:2:1 | 38.8 | 10600 | 1.66 |
| SE10 | 2,3-dichloroprop-1-ene | 3:2:1 | 34.7 | 11600 | 1.61 |
| CSE5 | benzyl bromide | 2:2:1 | 40.0 | ca 45000 | — |
| CSE6 | benzyl bromide | 2:3:1 | 37.2 | ca 50000 | — |

*molar ratio of chain terminating agent to reactive substrate (carbon tetrachloride) to dimanganese decacarbonyl.

SYNTHESIS EXAMPLE SE11

Example SE1 was repeated with minor procedural variations in that the reagents were all mixed as a 25% w/w solution in toluene under a nitrogen in the Schlenk tube (molar ratio of monomer:chain terminating agent:initiator 50:3:1), degassed and then heated to reaction temperature for 5 hours, with product recovery using precipitation by hexane or petroleum ether (40/60° C.). The reaction was run at 60, 70, 80, 90, 110 and 120° C. For runs above 100° C. a mixture of o- and p-xylene was used as the reaction solvent. Generally the reaction ran more quickly at the higher temperatures. The reaction conditions and the properties of the polymers produced are set out in Table 3 below.

TABLE 3

| Ex No | Temp (° C.) | Time (h) | Conv (%) | Mn | PDI |
|---|---|---|---|---|---|
| SE13.1 | 60 | 6 | 25 | 5500 | 1.52 |
| SE13.2 | 70 | 5 | 35 | 7600 | 1.49 |
| SE13.3 | 80 | 5 | 42 | 10200 | 1.27 |
| SE13.4 | 90 | 5 | 66 | 5900 | 1.49 |
| SE13.5 | 100 | 5 | 70 | 5300 | 1.51 |
| SE13.6 | 110 | 5 | 83 | 3700 | 1.36 |

SYNTHESIS EXAMPLE SE12

Example SE11 was repeated except that zinc chloride ($ZnCl_2$) was include in the reaction mixture at a molar ratio to dimanganese decacarbonyl of 5:1. The reaction was run at 60, 70, 80, 90, 110 and 120° C. The reaction conditions and the properties of the polymers produced are set out in Table 4 below.

TABLE 4

| Ex No | Temp. (°C.) | Time (h) | Conv (%) | Mn | PDI |
|---|---|---|---|---|---|
| SE13.1 | 60 | 5.5 | 54 | 6000 | 1.51 |
| SE13.2 | 70 | 5 | 57 | 6500 | 1.36 |
| SE13.3 | 80 | 5 | 64 | 5700 | 1.42 |
| SE13.4 | 90 | 5 | 88 | 5500 | 1.64 |
| SE13.5 | 110 | 5 | 77 | 4000 | 1.38 |
| SE13.6 | | | | | |

SYNTHESIS EXAMPLE SE13

Example SE12 was repeated at a reaction temperature of 60° C., but substituting various Lewis acids for the zinc chloride at varying levels. The materials, reaction conditions and the properties of the polymers produced are set out in Table 5 below.

TABLE 5

| Ex No | Lewis acid nature | equiv. | Time (h) | Conv (%) | Mn | PDI |
|---|---|---|---|---|---|---|
| SE13.1 | Zn(OTf)$_2$ | | 99 | 76 | 5500 | 1.52 |
| SE13.2 | YbCl$_3$.hydrate | 1 | 99 | 80 | 7500 | 1.52 |
| SE13.3 | La(OAc)$_3$.7H$_2$O | 1 | 99 | 76 | 6700 | 1.60 |
| SE13.4 | Sc(OTf)$_3$ | 1 | 93 | 80 | 5600 | 1.50 |
| SE13.5 | Sc(OTf)$_3$ | 5 | 28 | 39 | 3200 | 1.16 |
| SE13.6 | Yb(OTf)$_3$ | 5 | 45 | 97 | 7300 | 1.40 |
| SE13.7 | MgBr$_2$ | 5 | 28 | 79 | 6500 | 1.73 |
| SE13.8 | ZnCl$_2$ | 5 | 23 | 99 | 4600 | 1.51 |

The invention claimed is:

1. A method of polymerising ethylenically unsaturated monomers in which at least one ethylenically unsaturated monomer is polymerised using a catalyst system, comprising:
   i) a manganese carbonyl radical initiator;
   ii) a halogen containing reactive substrate; and
   iii) an allylic halogen substituted chain termination agent.

2. The method of claim 1, wherein the initiator is or comprises a compound represented by formula (I):

$$R^1-Mn(CO)_n(Lig)_p \qquad (I)$$

where
   $R^1$ independently represents a $C_1$ to $C_{30}$ hydrocarbyl; or a $C_1$ to $C_{30}$ hydrocarbyl substituted with halogen, alkyl, alkoxy, acyl; or
   $R^1$ independently represents a group of the formula: —Mn(CO)$_n$(Lig)$_p$;
   Lig independently represents a ligand species;
   n independently represents an integer from 1 to 5; and
   p independently represents an integer from 0 to 4;
wherein (n+p)=5.

3. The method of claim 2, wherein the initiator is or comprises a compound represented by formula (Ia):

$$(Lig)_p(CO)_nMn-Mn(CO)_n(Lig)_p \qquad (Ia)$$

where
   Lig independently represents a ligand species;
   n independently represents an integer from 1 to 5;
   p independently represents an integer from 0 to 4; and
wherein (n+p)=5.

4. The method of claim 3, wherein the initiator is dimanganese decacarbonyl.

5. The method of claim 1, wherein the allylic halogen substituted chain termination agent is a compound represented by formula (II):

$$Hal-CHR^3-CR^4=CH_2 \qquad (II)$$

where
   Hal independently represents halogen; and
   $R^3$ and $R^4$ each independently represents a hydrogen atom, or a group:

$$(Link)_n-R^5;$$

where:
   n independently represents an integer 0 or 1;
   Link independently represents a linking group; and
   $R^5$ independently represents halogen; glycidyl; an ethylenic double bond; carbonyl; carboxyl; cyano; hydroxyl; amino or quaternary amino or ammonium; a phosphorus containing species; a sulphur containing species; a hydrogen bond donor or acceptor; an aromatic ring; a heterocyclic ring; or a saccharide residue.

6. The method of claim 5, wherein Hal independently represents a chlorine atom or bromine atom.

7. The method of claim 1, wherein the reactive substrate is also a chain terminating agent.

8. The method of claim 1, wherein the reactive substrate is or comprises a halogen substituted alkane; an alcohol or carboxylic acid ester; an aromatic substituted alkyl halide; a ring substituted benzyl halide; or a sulphonyl halide.

9. The method of claim 8, wherein the reactive substrate has multiple halogen substitution.

10. The method of claim 8, wherein the reactive substrate is or comprises carbon tetrachloride; carbon tetrabromide; chlorotribromomethane; trichloromethane; tribromomethane; dichloromethane; dibromomethane; 1,1-dichloroethane; 1,1-dibromoethane; 1,1,1-trichloroethane; 1,1,1-tribromoethane; 2,2-dichloroethanol; 2,2-dibromoethanol; 2,2,2-trichloroethanol; 2,2,2-tribromoethanol; trichloroacetic acid; $C_1$ to $C_6$ alkyl esters of trichloroacetic acid; $C_2$ to $C_6$ alkyl 2-bromo-2-methyl propionates; benzyl halides; 2-halo-2-phenylethanes, 4-alkyl benzyl halides; 4-fluorobenzyl bromide; 4-chlorobenzyl bromide; 4-fluorobenzyl chloride; 4-chlorobenzyl chloride; 1,2-di(bromomethyl)benzene; benzene sulphonyl chloride; and toluene sulphonyl chloride.

11. The method of claim 1, wherein the monomer is or comprises one or more of an acrylic monomer; a vinyl acetate; a vinyl halide; a styrene; a α-methyl styrene; a vinyl toluene; a vinyl caprolactone; a vinyl caprolactam; or a N-vinyl pyrollidone.

12. The method of claim 11, wherein the monomer comprises at least 40 mole % of acrylic monomer or monomers.

13. The method of claim 11, wherein the acrylic monomer is or comprises monomer represented by formula (IV):

$$R^{10}-CR^{11}=CR^{12}-COR^{13} \qquad (IV)$$

where
   $R^{10}$ independently represents methyl or a hydrogen atom;
   $R^{11}$ independently represents methyl or a hydrogen atom;
   $R^{12}$ independently represents methyl or a hydrogen atom; and
   $R^{13}$ independently represents —OR$^{14}$ or —NR$^{15}$R$^{16}$;
wherein:
   i) at least one of $R^{11}$ and $R^{12}$ represents a hydrogen atom;
   ii) $R^{14}$, $R^{15}$, and $R^{16}$ independently represent a hydrogen atom; a hydrocarbyl group; or a polyalkyleneoxy chain.

14. The method of claim 13, wherein the monomer is or comprises one or more of the following: an acrylate ester; a methacrylate ester; acrylic acid; methacrylic acid; an acrylic amide; a methacrylic amide; or a sulphonated acrylic monomer.

15. The method of claim 1, wherein the reaction conditions comprise heating the reaction mixture containing the manganese carbonyl radical initiator to initiate thermolysis of the initiator.

16. The method of claim 15, wherein the reaction is carried out at a temperature of from 50 to 150° C.

17. The method of claim 16, wherein the reaction is carried out at a temperature of from 50 to 100° C.

18. The method of claim 1, wherein the reaction conditions comprise exposing the reaction mixture containing the manganese carbonyl radical initiator to actinic radiation to initiate photolysis of the initiator.

19. The method of claim 18, wherein the actinic radiation is visible or ultraviolet light.

20. The method of claim 18, wherein the reaction is carried out at a temperature of from −50 to 100° C.

21. The method of claim 1, wherein the reaction mixture further comprises a Lewis acid.

22. The method of claim 21, wherein the Lewis acid comprises a metal containing Lewis acid.

23. The method of claim 22, wherein the metal containing Lewis acid, comprises a magnesium salt; a zinc salt; a lanthanum salt; or a ytterbium salt.

24. A method of polymerising ethylenically unsaturated monomers in which at least one ethylenically unsaturated monomer is polymerised using a catalyst system, comprising:
  i) a manganese carbonyl radical initiator;
  ii) a halogen containing reactive substrate; and
  iii) an allylic halogen substituted chain termination agent;
wherein the polymerization further comprises a metal containing Lewis acid, comprising magnesium bromide; magnesium chloride; zinc bromide; zinc chloride; zinc trifluoromethanesulfonate; lanthanum acetate; lanthanum acetate heptahydrate; ytterbium chloride; or ytterbium triflate.

25. The method of claim 23, wherein the metal containing Lewis acid comprises a magnesium halide, a zinc halide, a lanthanum salt, or a ytterbium halide.

26. The method of claim 23, wherein the metal containing Lewis acid, comprises magnesium bromide; magnesium chloride; zinc bromide; zinc chloride; zinc trifluoromethanesulfonate; lanthanum acetate; lanthanum acetate heptahydrate; ytterbium chloride; or ytterbium triflate.

27. The method of claim 26, wherein the metal containing Lewis acid, comprises lanthanum acetate heptahydrate.

28. A catalyst system for polymerising ethylenically unsaturated monomers, comprising:
  i) a manganese carbonyl radical initiator;
  ii) a halogen containing reactive substrate; and
  iii) an allylic halogen substituted chain termination agent.

29. The catalyst system of claim 28, wherein the initiator is or comprises the compound represented by formula (I).

30. The catalyst system of claim 28, wherein the chain terminating agent is or comprises the compound represented by formula (II).

31. The catalyst system of claim 28, wherein the reactive substrate is also a chain terminating agent.

32. The catalyst system of claim 28, further comprising a Lewis acid.

33. The catalyst system of claim 32, wherein the Lewis acid comprises a metal containing Lewis acid.

34. The catalyst system of claim 33, wherein the metal containing Lewis acid, comprises a magnesium salt; a zinc salt; a lanthanum salt; or a ytterbium salt.

35. The catalyst system of claim 34, wherein the metal containing Lewis acid, comprises magnesium bromide; magnesium chloride; zinc bromide; zinc chloride; zinc trifluoromethanesulfonate; lanthanum acetate; lanthanum acetate heptahydrate; ytterbium chloride; or ytterbium triflate.

36. The catalyst system of claim 35, wherein the metal containing Lewis acid, comprises lanthanum acetate heptahydrate.

37. The catalyst system of claim 34, wherein the metal containing Lewis acid comprises a magnesium halide; a zinc halide; a lanthanum salt, or a ytterbium halide.

38. A catalyst system for polymerising ethylenically unsaturated monomers, comprising:
  i) a manganese carbonyl radical initiator;
  ii) a halogen containing reactive substrate;
  iii) an allylic halogen substituted chain termination agent; and
  iv) a metal containing Lewis acid, comprising magnesium bromide; magnesium chloride; zinc bromide; zinc chloride; zinc trifluoromethanesulfonate; lanthanum acetate; lanthanum acetate heptahydrate; ytterbium chloride; or ytterbium triflate.

* * * * *